United States Patent
May-Weymann et al.

(10) Patent No.: US 9,014,342 B2
(45) Date of Patent: Apr. 21, 2015

(54) MOBILE COMMUNICATION DEVICE, AN APPARATUS AND A METHOD FOR IMPROVING CALL SETUP FAILURE RATE AND QUALITY FOR HEARING IMPAIRED CALLS

(71) Applicant: Nvidia Corporation, Santa Clara, CA (US)

(72) Inventors: Alexander May-Weymann, Sophia Antipolis (FR); Bruno De Smet, Sophia Antipolis (FR); Flavien Delorme, Sophia Antipolis (FR)

(73) Assignee: Nvidia Corporation, Santa Clara, CA (US)

(*) Notice: Subject to any disclaimer, the term of this patent is extended or adjusted under 35 U.S.C. 154(b) by 0 days.

(21) Appl. No.: 14/021,504

(22) Filed: Sep. 9, 2013

(65) Prior Publication Data
US 2015/0072661 A1 Mar. 12, 2015

(51) Int. Cl.
H04M 11/00 (2006.01)
H04M 1/247 (2006.01)
H04M 3/42 (2006.01)
H04W 4/16 (2009.01)

(52) U.S. Cl.
CPC ........ H04M 1/2475 (2013.01); H04M 3/42391 (2013.01); H04W 4/16 (2013.01)

(58) Field of Classification Search
CPC .................................................. H04M 3/42391
USPC ......................................... 455/414.1; 379/52
See application file for complete search history.

(56) References Cited

U.S. PATENT DOCUMENTS

| 2006/0140353 | A1* | 6/2006 | Jung ............................... 379/52 |
| 2007/0121587 | A1* | 5/2007 | M. Mundra et al. .......... 370/352 |
| 2010/0228553 | A1* | 9/2010 | Morii ............................. 704/500 |
| 2012/0164999 | A1* | 6/2012 | Chae et al. ..................... 455/418 |
| 2014/0029472 | A1* | 1/2014 | Michaelis et al. ............. 370/259 |

OTHER PUBLICATIONS

Dorbecker, M., et al., "The Cellular Text Telephone Modem—The Solution for Supporting Text Telephone Functionality in GSM Networks," International Conference on Acoustics, Speech, and Signal Processing-ICASSP, IEEE International Conference, vol. 3, pp. 1441-1444, May 7-11, 2001.

"3rd Generation Partnership Project; Technical Specification Group Services and System Aspects; Cellular Text Telephone Modem; General Description (Release 11)," 3GPP TS 26.226, V11.0.0, Sep. 2012, 10 pages.

"3rd Generation Partnership Project; Technical Specification Group Core Network and Terminals; Mobile Radio Interface Layer 3 Specification; Core Network Protocols; Stage 3 (Release 12)," 3GPP TS 24.008, V12.2.0, Jun. 2013, 682 pages.

\* cited by examiner

*Primary Examiner* — Creighton Smith

(57) ABSTRACT

A mobile communication device, a method of establishing a mobile telephone voice call and an apparatus are provided herein. In one embodiment, the mobile communication device includes: 1) a processor configured to indicate a voice call employing the mobile communication device is a hearing impaired call and (3) a modem configured to initiate establishment of the hearing impaired call with a mobile cellular network, wherein the establishment includes providing a hearing impaired codec list to the mobile cellular network.

18 Claims, 4 Drawing Sheets

MOBILE COMMUNICATION DEVICE, AN APPARATUS AND A METHOD FOR IMPROVING CALL SETUP FAILURE RATE AND QUALITY FOR HEARING IMPAIRED CALLS

TECHNICAL FIELD

This application is directed, in general, to mobile communication devices and, more specifically, to providing teletypewriter (TTY) functionality in mobile communication systems.

BACKGROUND

TTY is a device that enables hearing impaired or deaf individuals, herein collectively referred to as hearing impaired individuals, to communicate via a telephone using text or characters. Original TTY machines were acoustic couplers that held the handset receiver of a telephone and were used with the PSTN. To continue providing this service in the United States of America (USA), the Federal Communications Commission of the USA requires service providers and cell phone manufacturers to provide accessibility for hearing impaired individuals in cellular telephone systems.

Cell phones use a cellular text telephone (CTM) modem to provide TTY service for hearing impaired individuals. A CTM modem has a transmitter and a receiver that allows the reliable transmission of text using a speech channel of cellular telephone systems or PSTN networks. The CTM modem can be external to the cell phone or included within a cell phone.

SUMMARY

In one aspect a mobile communication device is disclosed. In one embodiment, the mobile communication device includes: (1) a processor configured to indicate a voice call employing the mobile communication device is a hearing impaired call and (3) a modem configured to initiate establishment of the hearing impaired call with a mobile cellular network, wherein the establishment includes providing a hearing impaired codec list to the mobile cellular network.

In another aspect, the disclosure provides a method of establishing a mobile telephone voice call via a mobile communication device. In one embodiment, the method includes: (1) receiving an indication that the voice call is a hearing impaired call, (2) initiating establishment of the voice call with a mobile cellular network, (3) indicating to the mobile cellular network that the voice call is a hearing impaired call and (4) providing a hearing impaired codec list to the mobile cellular network.

In yet another aspect, the disclosure provides an apparatus of a mobile cellular network. In one embodiment, the apparatus includes: (1) a codec selector configured to select a voice codec for a hearing impaired call for a mobile communication device based on if the voice codec supports hearing impaired calls and (2) a communicator configured to establish the voice call with the mobile communication device employing the voice codec.

BRIEF DESCRIPTION

Figure 1:
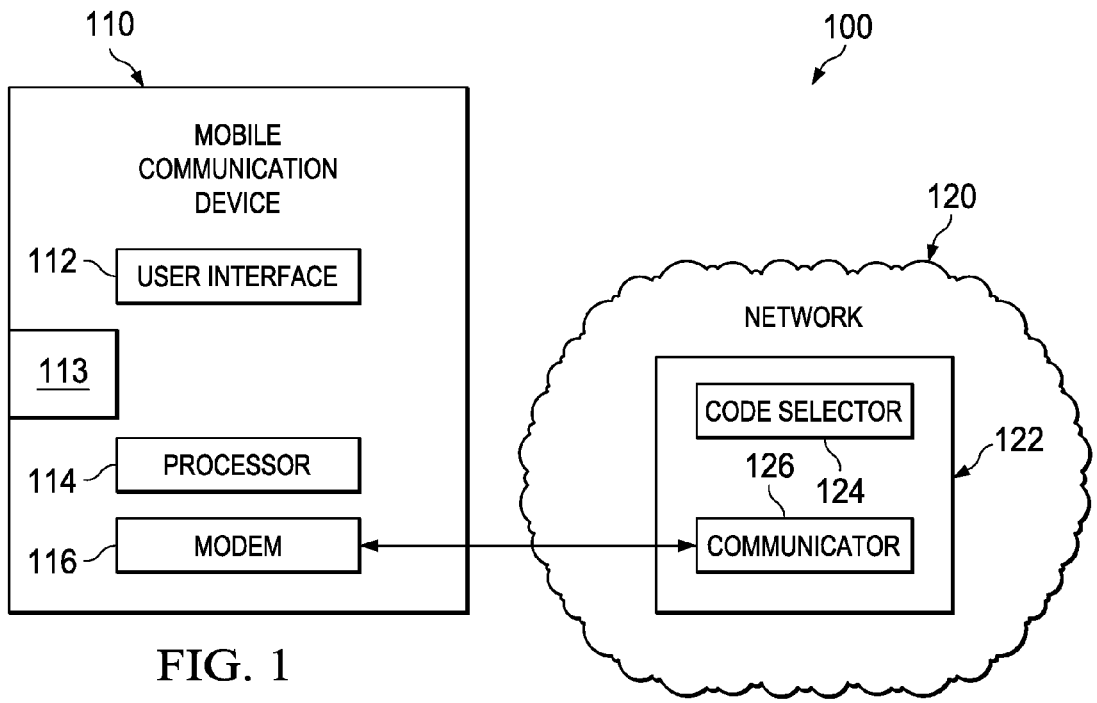

Reference is now made to the following descriptions taken in conjunction with the accompanying drawings, in which:

FIG. 1 illustrates a system diagram of an embodiment of a mobile cellular network constructed according to the principles of the disclosure; and FIG. 2 to FIG. 6 each illustrate a signaling chart for an embodiment of a method for establishing or conducting a voice call carried out according to the principles of the disclosure.

DETAILED DESCRIPTION

During the establishment phase of a voice call, a mobile communication device will signal to the service provider of a mobile cellular network if the voice call is a hearing impaired call. A hearing impaired call is a voice call over a telephone network, such as a mobile cellular network, that has been identified to employ or potentially employ text from a hearing impaired character device during the voice call. A hearing impaired call does not have to actually employ the text during the call. For example, a hearing impaired call can be when a mobile communications device informs a mobile cellular network of the use or potential use of CTM text in a voice call.

Hearing impaired character devices are used by hearing impaired individuals to communicate over circuit switched (CS) voice channels of all kinds of telephone networks—including 2G and 3G networks. Hearing impaired character devices include a TTY/CTM terminal or another type of device configured to transmit characters for the hearing impaired (hereinafter referred to as communication characters), including text, over a voice channel. A TTY/CTM terminal is a mobile communication device, such as a cell phone, or another device with TTY capability that generates CTM text that can be transmitted over a voice channel. The CTM text can be transmitted in compliance with the Third Generation Partnership Program (3GPP), which maintains the 3GPP standard that applies to most modern mobile communication networks and devices. In addition to cell phones such as smart phones, a mobile communication device includes other devices configured to communicate over a wireless communication network. For example, a mobile communication device also includes computers, laptops and tablet computers.

Also during the call establishment, the mobile communication device will signal as well all the channel coding it can support for voice calls. For example, the mobile communication device can indicate via conventional means that the GSM Full Rate, GSM Half Rate, Enhanced Full Rate, Adaptive Multi-Rate (AMR), AMR-half rate and Wide band AMR (WB-AMR) are supported. One skilled in the art will understand that additional voice codecs, include future developed codecs, can be supported by the mobile communication device.

Based on this information the mobile cellular network will assign a traffic channel for the voice call. Typically, the mobile cellular network will select from available and applicable traffic channels the traffic channel with the highest voice quality, which currently can be WB-AMR. On the assigned channel of a hearing impaired call, it is then possible to transmit speech as well as text. Nevertheless, the higher quality voice codecs are not made to support text for the hearing impaired (communication characters) such as CTM text, but to support good speech quality. Thus, a selected codec can have a high character error rate during the transmission. This can be especially true for codec implementations that are less mature.

As noted above, a voice call may be identified as a hearing impaired call during establishment thereof but a hearing impaired character device could actually not be used and no negotiation procedure for employing the device, such as a TTY/CTM negotiating procedure according to 3GPP standards, is ever started during the lifetime of the call. For example, a mobile communication device can be used by different users at different times wherein one of the users is hearing impaired and the user profile for the mobile communication device includes a mode for CTM text, i.e., a TTY/CTM mode. A user who is not hearing impaired, however, may use the mobile communication device and not use CTM text during the call. Thus, a codec could be selected for the voice call based on support for CTM text even though it will not be used. This could result in using a codec with lower voice quality than necessary.

The disclosure provides improved devices and methods for employing hearing impaired character devices in mobile networks. Improved schemes are disclosed herein that improve the Call Setup Failure (CSF) rate and the quality of hearing impaired calls. Mobile communication devices and mobile cellular networks that employ the improved method and schemes are also disclosed. FIG. 1 illustrates which part of a mobile communication device and mobile cellular network are impacted by the disclosure.

The disclosure provides different embodiments that provide improved communication for hearing impaired calls with improvements from the mobile cellular network side, the mobile communication device side and a combination thereof. For example, in case a hearing impaired call is started, the mobile cellular network can take into account not only the available voice codec with the highest voice quality, but available voice codecs with worse voice quality if the use of communication characters is not supported by the voice codec with the highest voice quality.

In the case that during a hearing impaired call a high character error rate is noticed on the mobile cellular network side, the mobile cellular network could assign another voice channel that is known to work better for hearing impaired calls. In one embodiment, a high character error rate is a character error rate greater than one percent (1%). In another embodiment, a high character error rate is an error rate greater than five percent (5%). In some embodiments, the character error rate is a dynamic value that is within an acceptable range. For example, an acceptable character error rate can be between 1% and 5%. The dynamic value can depend of the mobile cellular network and/or the modem implementation. The mobile cellular network can be informed of the high character error rate by the mobile communication device in response to a quality check thereby.

In some embodiments, the mobile cellular network can always start a hearing impaired call with the highest quality voice codec that is available. Then, when or as soon as a negotiation is started by the user to use communication characters (e.g., CTM text), the mobile cellular network could assign another voice channel that is known to work better for hearing impaired calls (e.g., TTY/CTM calls). This allows benefiting from the higher voice quality available as long as there is no need to transmit actual characters. Considering the mobile communication device, the mobile communication device could have a default that limits the supported voice codecs in case a hearing impaired call is started to allow only voice codecs for the call setup that are known to work well for transmitting communication characters for hearing impaired people.

The mobile communication device could on a first mobile originated (MO) call attempt try to indicate all supported voice codecs to the mobile cellular network including, for example, WB-AMR. If the hearing impaired call is aborted by the mobile communication network due to a reason that indicates problems assigning the voice codec, the mobile communication device will automatically start a second attempt with a reduced set of supported voice codecs being signaled to the mobile communication device.

Additionally the mobile communication device can store the public land mobile network (PLMN) locally to remember the failure of the hearing impaired call. A processor of the mobile communication device can be configured to note the failure and store the PLMN in a memory of the mobile communication device. A subsequent hearing impaired call attempt on the noted PLMN can then directly use a reduced codec set to improve the call setup speed compared to the initial time. Mobile terminated (MT) calls will work as well, once the PLMN is added to the stored list of the mobile communication device.

The mobile communication device could start similar to the above method and additionally measure the correctness/quality of the received communication characters. If the mobile communication device notices a higher character error rate (e.g., higher than 2%) on a high quality voice codec, the mobile communication device can automatically add the PLMN to the stored list, or another stored list, so that at the next call a voice codec can be chosen that meets the quality criteria. In some embodiments, the higher character error rate can be a dynamic value that is within a range of acceptable character error rates (i.e., an acceptable character error rate). The dynamic value can depend on the network and/or the modem implementation. In some embodiments an acceptable character error rate can be in the range from 1% to 5%.

Although the TTY functionality is an old heritage from fixed line networks, mobile communication devices and mobile cellular networks are still required to provide this functionality for hearing impaired individuals. To prevent failure during call setups due to the selection of high voice quality codecs and to improve the quality of transmitted character streams for hearing impaired calls, various embodiments are disclosed herein. One such embodiment includes modifying the codec list in the mobile communication device based on the fact that a hearing impaired call may occur. This can result in less call setup failures for normal voice calls and emergency calls. A hearing impaired codec list is a reduced list from a mobile communication device of voice codecs that are supported by the mobile communication device and that support hearing impaired calls. In some embodiments, the hearing impaired codec list can include only a single voice codec.

FIG. 1 illustrates a system diagram of an embodiment of a communications system 100 constructed according to the principles of the disclosure. The communications system 100 includes a mobile communications device 110 and a mobile cellular network 120.

The mobile communication device 110 is configured to communicate with other communication devices via the mobile cellular network 120. The mobile communication device 110 includes a user interface 112, an equipment interface 113, a processor 114 and a modem 116. The user interface 112 is configured to receive user input and provide an interface between the mobile communication device 110 and a user. The user interface 112 includes, for example, a touch screen, a display, a keyboard and a touchpad. The equipment interface 113 is configured to provide an interface to connect equipment, devices or components to the mobile communications device 110. For example, a TTY/CTM terminal can be connected thereto. Both the user interface 112 and the equipment interface 113 can be conventional components of mobile communication device understood by one skilled in the art.

The processor 114 is configured to direct operation of the mobile communication device 110. The processor 114 can include the necessary logic to provide the functionality of a processor in a conventional mobile communication device.

Additionally, the processor 114 is configured to indicate a voice call employing the mobile communication device 110 is a hearing impaired call. In one embodiment, the processor 114 generates a hearing impaired (HI) signal in response to an input received via the user interface 112 or the equipment interface 113 that indicates a subsequent call associated with the mobile communication device 110 is a hearing impaired call. The HI signal is sent to the modem 116 for processing of a subsequent call.

In some embodiments, the processor 114 is configured to automatically generate the HI signal upon receipt of CTM signals received via the equipment interface 113. The CTM signals can be received, for example, via a TTY/CTM terminal connected to the equipment user interface 114. The processor 114 can also be configured to generate the HI signal in response to receiving an indication via the user interface 114 of a hearing impaired call. In one embodiment, the mobile communication device 110 can include a setting for hearing impaired calls that a user can select via the user interface 112. For example, the setting can be for a TTY/CTM mode.

The processor 114 is further configured with the necessary circuitry or logic to perform at least some of the functionality disclosed herein. For example, the processor 114 can be configured to perform at least some of the functionality indicated below in FIG. 2 to FIG. 6. In some embodiments, the processor 114 is configured to store a traffic channel assigned for the voice call by the mobile cellular network based on failure of the establishment of the hearing impaired call. Additionally, the processor 114 can be configured to store a traffic channel assigned for the voice call by the mobile cellular network based on a character error rate of the hearing impaired call. In some embodiments, the processor 114 is configured to determine a high character error rate during a hearing impaired call and transmit a high error rate signal to the mobile cellular network 120 via the modem 116.

The modem 116 is configured to connect the mobile communication device 110 to the mobile cellular network 120. In one embodiment, the modem 116 is configured to provide communication with the mobile cellular network 120 in compliance with 3GPP standards. The modem 116 is configured to initiate establishment of the hearing impaired call with the mobile cellular network 120, which includes providing a list of voice codecs to the mobile cellular network 120 that the mobile communication device 110 can employ. The list of supported voice codecs can include, for example, codecs that the mobile communication device 110 supports for Universal Terrestrial Radio Access Network (UTRAN) and/or GSM/Edge Radio Access Network (GERAN). In some embodiments, the codec list is a hearing impaired codec list. The modem 116 is configured to establish the hearing impaired call by also sending a hearing impaired mode indicator to the mobile cellular network 120. In one embodiment, the hearing impaired mode indicator is a CTM bit in a bearer capability information element (IE) in accordance with 3GPP standards. The modem 116 modem is further configured to conduct the hearing impaired call employing a speech codec selected from the hearing impaired codec list by the mobile cellular network 120.

The modem 116 may include a processor and, operatively coupled thereto, a non-transitory computer-readable storage medium such as a magnetic or electronic memory storing soft-modem code. The code on the storage medium is arranged to be executed on the modem processor to communicate with the mobile cellular network 120. However, the possibility of some or all of the modem functionality being implemented in dedicated hardware is not excluded. The modem may be configured in a similar manner to conventional modem with additional functionality added in accordance with the principles of the disclosure, such as provided in FIG. 2 to FIG. 6. In some embodiments, at least a portion of the functionality of the processor 114 disclosed herein can be included within the modem 116, i.e., a processor and/or a memory thereof.

The mobile cellular network 120 is configured to provide wireless communication for mobile communication devices. The mobile cellular network 120 can be a 3GPP network or other type of CDMA network. The mobile cellular network 120 includes a network apparatus 122 that is configured to establish communication with the mobile communication device 110. The network apparatus 122 includes a codec selector 124 and a communicator 126. The network apparatus 122 can be, for example, a mobile switching center, which is responsible for codec selection in a 3GPP network. As such, the network apparatus 122 may be configured in a similar manner to a conventional mobile switching center with additional functionality added in accordance with the principles of the disclosure, an example of which will be discussed in more detail below with respect to FIG. 2 to FIG. 6.

The codec selector 124 is configured to select a voice codec for a hearing impaired call for a mobile communication device based on if the voice codec supports hearing impaired calls. In one embodiment the codec selector 124 is configured to select a first voice codec based on if the voice codec supports hearing impaired calls and is configured to select a second voice codec during the hearing impaired call based on an error character rate. In this embodiment, the second voice codec would typically have a lower voice quality than the first voice codec. The code selector 124 can be configured to receive the error character rate from the mobile communication device 110 in one embodiment.

In another embodiment, the codec selector 124 is configured to select a second voice codec for a hearing impaired call based on the if the selected voice codec supports hearing impaired calls and is configured to select a first voice codec having a high voice quality for establishing the hearing impaired call and select the second voice codec during the hearing impaired call in response to a negotiation procedure to transmit characters during the hearing impaired call.

The communicator 126 is configured to establish the voice call with the mobile communication device employing the voice codec. The communicator 126 may be, for example, a modem that can operate in compliance with the 3GPP standards.

FIG. 2 to FIG. 6 illustrate signaling charts of various methods of establishing hearing impaired calls carried out according to the principles of the disclosure. The various messages or signals illustrated in FIG. 2 to FIG. 6 are between a mobile cellular network 210, a modem 220 and a user 230. The mobile cellular network 210 can be the mobile cellular network 120 of FIG. 1 and the modem 220 can be the modem 116 of FIG. 1. The user 230 represents an individual, such as a hearing impaired individual, who employs a mobile communication device, e.g., mobile communication device 110, having the modem 220. A single element number is used in FIG. 2 to FIG. 6 to indicate the same message or signal.

Figure 2:
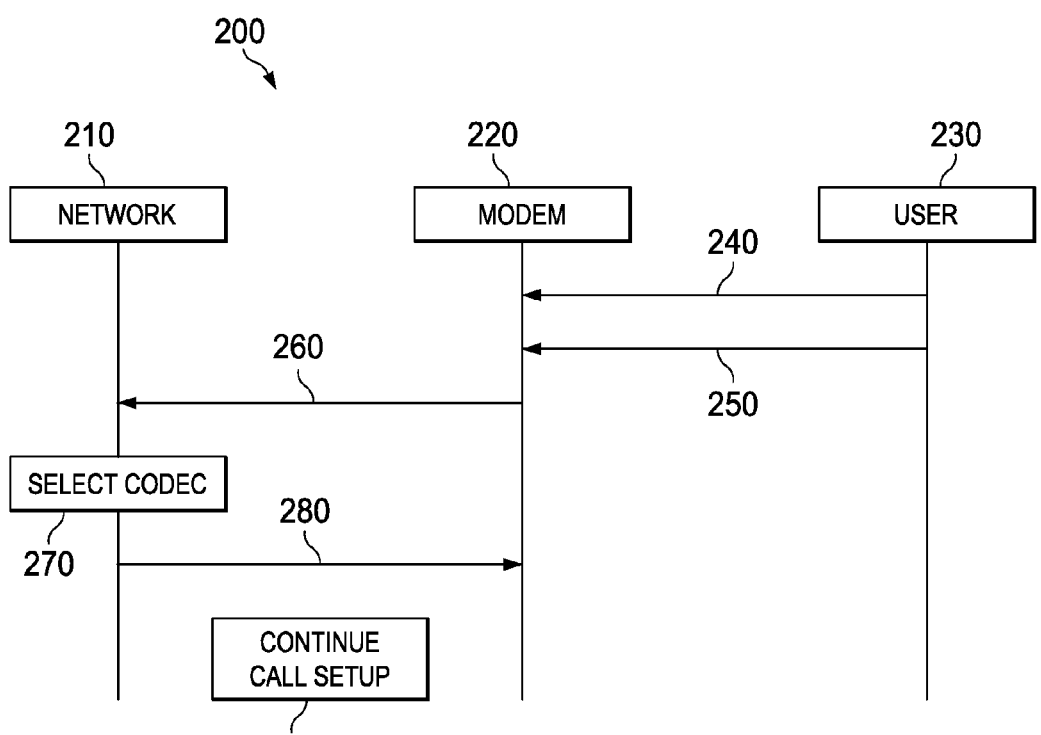

FIG. 2 illustrates a signaling chart for an embodiment of a method 200 for establishing a call carried out according to the principles of the disclosure. The method 200 is for a mobile cellular network that automatically selects a codec that supports hearing impaired calls. The mobile cellular network can store such a list of voice codecs in a memory thereof. The method 200 begins with the user 230 indicating a subsequent voice call employing the mobile communication device is a hearing impaired call in a step 240. The user 230 can provide this indication via a user input to the mobile communication device. In some embodiments, the user 230 can connect a TTY/CTM modem to the mobile communication device to indicate the hearing impaired call. Indication of a hearing impaired call is done before starting the call (e.g., ATD<number> command). In one embodiment, there is no required amount of time in which this has to be done before starting the call. For example, step 240 can occur a second before starting a call or a day before starting the call.

In a step 250, the voice call is initiated. The voice call can be initiated via an input from the user 230 by, for example, dialing a telephone number. A processor of the mobile communication device, such as the processor 114 of FIG. 1, can signal the modem 220 to start the voice call.

In a step 260, the modem 220 sends a message to the mobile cellular network 210 to establish the voice call. The message includes a hearing impaired mode indicator and a codec list supported by the mobile communication device. In one embodiment, the message of step 260 is a "CC SETUP" message that includes a CTM bit, 2G codec information in the bearer capabilities IE and the supported codecs IE for 3G capable devices. Thus, the message to establish the call can include two codec lists; one in the bearer capabilities IE that is only valid for 2G and one in the supported codecs IE which is valid in 2G and 3G. The list of the supported codec IE is typically added as soon as a mobile communication device supports 3G voice. Typically there is no conflict for the 2G channels in the lists.

In step 270, the mobile cellular network 210 chooses a speech codec for the call that is known to work well for communication characters such as CTM text. In one embodiment, the mobile cellular network 210 selects the codec from a memory of the mobile cellular network 210. For example, the codec can be selected from a memory associated with the mobile cellular network 210, such as a memory of the network apparatus 122 of FIG. 1.

In a step 280, the mobile cellular network 210 assigns a radio channel for the call. Setup for the call continues in a step 290. In one embodiment, setup 290 can continue according to conventional procedures such as 3GPP standards.

Figure 3:
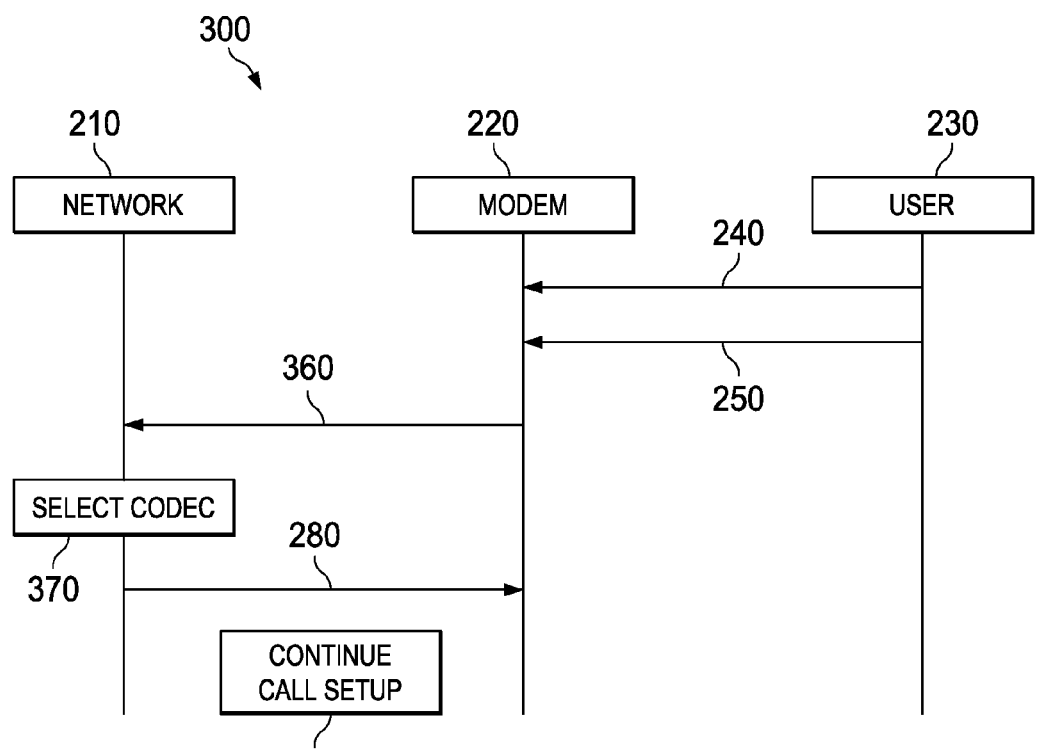

FIG. 3 illustrates a signaling chart for an embodiment of a method 300 for establishing a call carried out according to the principles of the disclosure. In the method 300, the mobile cellular network 210 selects a voice codec from the hearing impaired list provided by the modem 220. In method 300, the modem 220 automatically decreases the amount of submitted codecs for consideration if the possibility of a hearing impaired call is requested by the user. The method 300 begins with steps 240 and 250.

In a step 360, the modem 220 sends a message to the mobile cellular network 210 to establish the voice call. The message includes a hearing impaired mode indicator and a hearing impaired codec list. In one embodiment, the message of step 360 is a "CC SETUP" message that includes a CTM bit in the bearer capabilities and only the supported codecs that work well for hearing impaired calls. The method 300 continues with steps 280 and 290.

Figure 4:
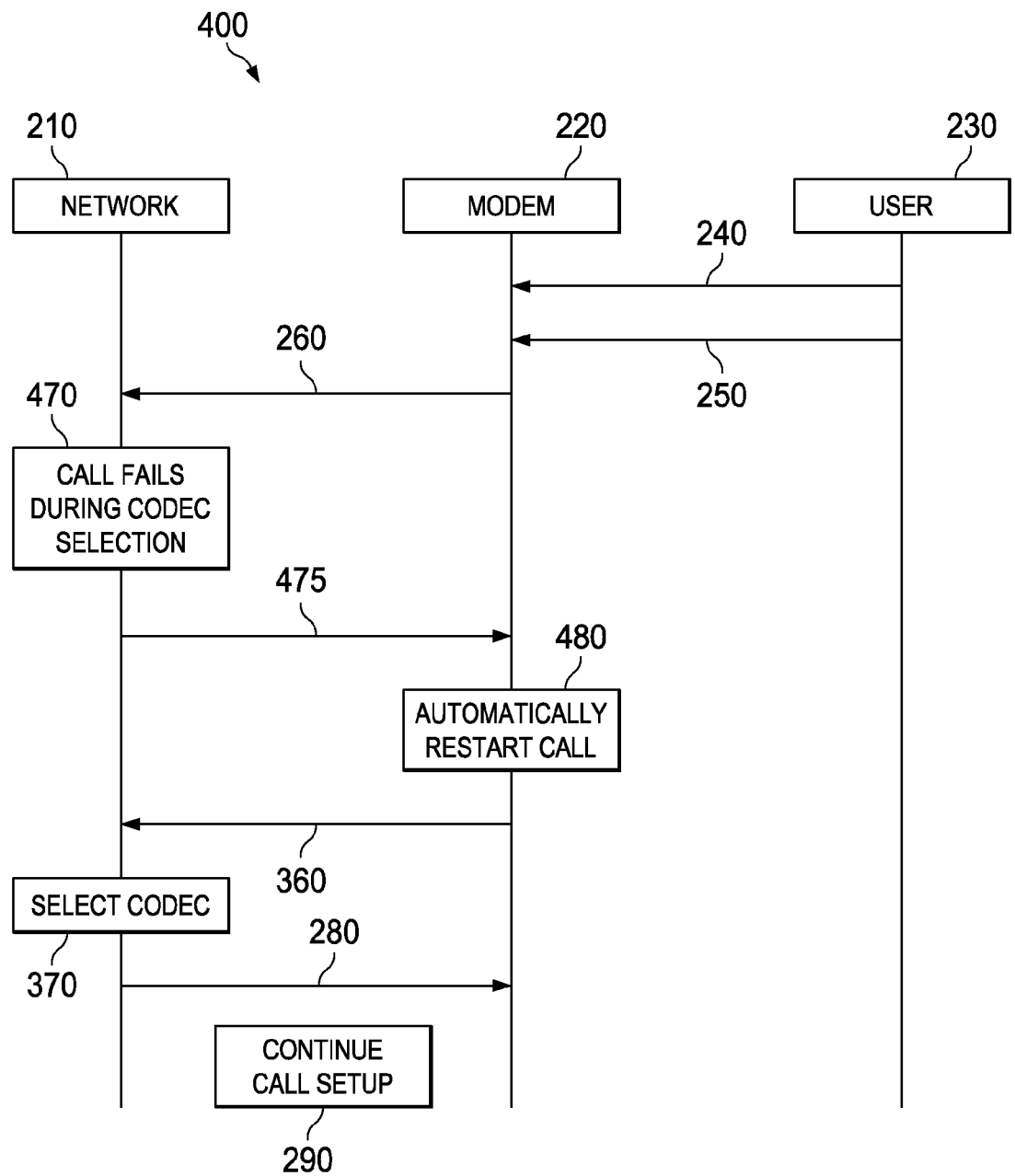

FIG. 4 illustrates a signaling chart for an embodiment of a method 400 for establishing a call carried out according to the principles of the disclosure. In the method 400, the mobile cellular network 210 automatically retries establishing a voice call if the call is a hearing impaired call and fails to be established during setup. The method 400 begins with steps 240, 250 and 260.

The method 400 continues with step 470 wherein the mobile cellular network 210 fails to select a codec for the call. In one embodiment, the failure can be due to the mobile cellular network 210 selecting the available voice codec having the highest voice quality but does not support hearing impaired calls. In a step 475, the mobile cellular network 210 informs the modem 220 that the call was not established. A CC RELEASE message of a lower layer release can be sent to inform the modem 220 of the failure.

In a step 480, the modem 220 automatically restarts the call. The method 400 then continues with steps 360, 370, 280 and 290.

Figure 5:
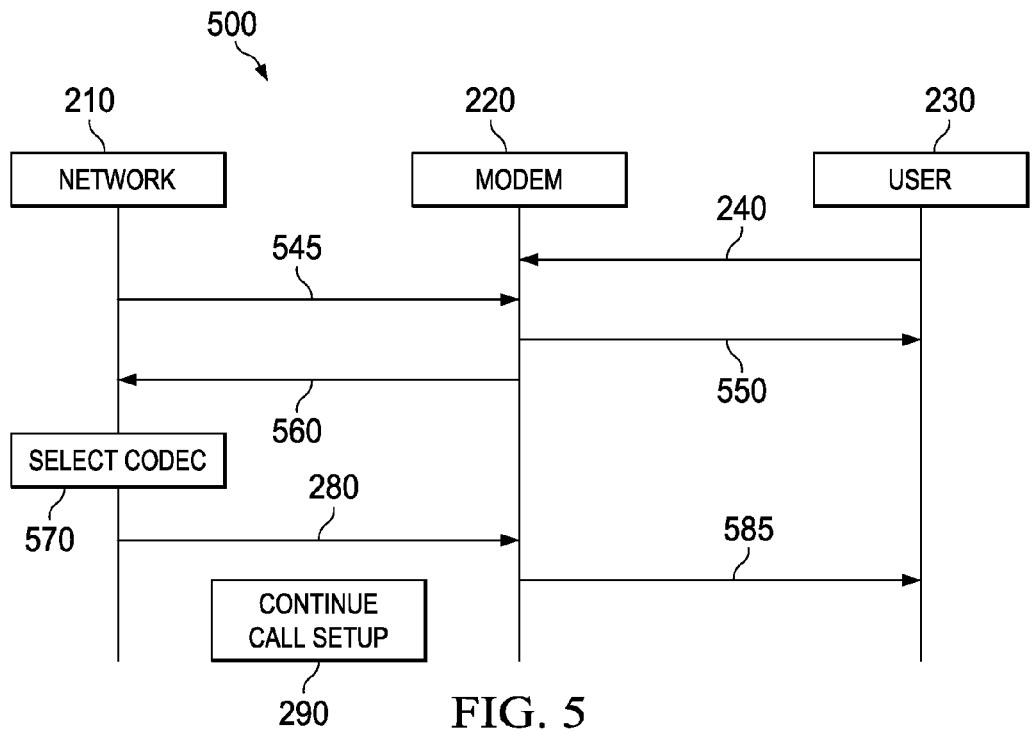

FIG. 5 illustrates a signaling chart for an embodiment of a method 500 for establishing a call carried out according to the principles of the disclosure. In the method 500, the call is terminated at the mobile communication device, i.e., a MT call. For a MT call, the codecs are provided to the mobile cellular network 210 via a call confirmation message instead of a call setup message as with the MO represented calls in FIG. 2, FIG. 3 and FIG. 4. The method 500 begins with step 240.

In step 545, the mobile cellular network 210 begins establishing the call by informing the modem 220. In one embodiment a CC SETUP message for a MT call can be used to start the setup. In a step 550, the user 230 or mobile communication device is notified of the incoming call. The modem 220 then confirms the call with the mobile cellular network in a step 560. A CC CALL CONFIRMED message can be used. With the call confirmation, notification of a hearing impaired call and a list of supported codecs for the mobile communication device are provided. A CTM bit can be used in the CC CALL CONFIRMED message. The codec list can be a hearing impaired codec list.

In a step 570, the mobile cellular network 210 selects a codec for the hearing impaired call from the confirmation message 560 that includes the coded list provided by the modem 220. After step 280, the mobile communication device starts ringing in a step 585. Call setup then continues in step 290.

Figure 6:
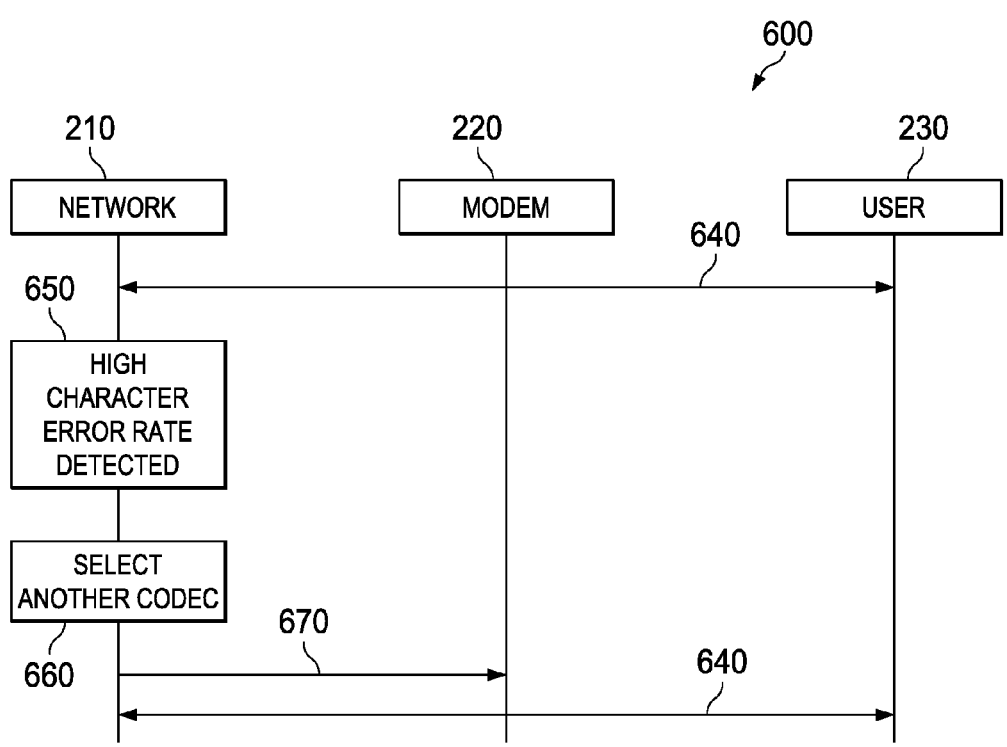

FIG. 6 illustrates a signaling chart for an embodiment of a method 600 for conducting a call carried out according to the principles of the disclosure. In the method 600, the call is ongoing between the mobile cellular network 210 and the mobile communication device or modem 220 thereof. The method 600 begins with step 640 wherein communication characters are transmitted between the user 230 and the mobile cellular network 210 via the modem 220. In a step 650, the mobile cellular network 210 detects a high character error rate. In one embodiment, the mobile cellular network 210 detects the high character error rate through a test string sent to the modem 220. In response, the mobile cellular network 210 selects another codec for the call in step 660 that provides an improved character rate compared to the first codec that was selected. The improved character rate codec can be selected from a confirmation message sent to the mobile cellular network 210 from the modem 220. In a step 660, the mobile cellular network 210 assigns an improved radio channel for the call. Characters are then transmitted between the mobile cellular network 210 and the user 230 employing the improved codec.

A portion of the above-described apparatuses, mobile communication devices or methods may be embodied in or performed by various, such as conventional, digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions of the apparatuses or devices described herein.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this application relates will appreciate that other and further additions, deletions, substitutions and modifications may be made to the described embodiments.

What is claimed is:

1. A mobile communication device, comprising:
   a processor configured to indicate a voice call employing said mobile communication device is a hearing impaired call; and
   a modem configured to initiate establishment of said hearing impaired call with a mobile cellular network, wherein said establishment includes providing a hearing impaired codec list to said mobile cellular network.

2. The mobile communication device as recited in claim 1 wherein said establishment further includes providing a hearing impaired mode indicator to said mobile cellular network.

3. The mobile communication device as recited in claim 2 wherein said hearing impaired mode indicator is a CTM bit in a bearer capability IE.

4. The mobile communication device as recited in claim 1 wherein said hearing impaired codec list is a reduced set of codecs supported by said mobile communication device based on support of hearing impaired calls.

5. The mobile communication device as recited in claim 1 wherein said voice call is a restarted voice call that is automatically restarted by said modem.

6. The mobile communication device as recited in claim 1 wherein said processor is further configured to store a traffic channel assigned for said voice call by said mobile cellular network based on failure of said establishment of said hearing impaired call.

7. The mobile communication device as recited in claim 1 wherein said processor is further configured to store a traffic channel assigned for said voice call by said mobile cellular network based on a character error rate of said hearing impaired call.

8. The mobile communication device as recited in claim 1 wherein said modem is further configured to conduct said hearing impaired call employing a speech codec selected from said hearing impaired codec list by said mobile cellular network.

9. The mobile communication device as recited in claim 1 wherein said processor is further configured to determine a high character error rate during said hearing impaired call and transmit a high error rate signal to said mobile cellular network.

10. The mobile communication device as recited in claim 1 wherein said hearing impaired call is TTY/CTM call.

11. A method of establishing a mobile telephone voice call via a mobile communication device, comprising:
    receiving an indication that said voice call is a hearing impaired call;
    initiating establishment of said voice call with a mobile cellular network;
    indicating to said mobile cellular network that said voice call is a hearing impaired call; and
    providing a hearing impaired codec list to said mobile cellular network.

12. The method as recited in claim 11 wherein said indication is via a user interface or an equipment interface of said mobile communication device.

13. The method as recited in claim 11 wherein said hearing impaired codec list only includes voice codecs supported by said mobile communication device and that support hearing impaired calls.

14. The method as recited in claim 11, wherein before said providing said hearing impaired codec list, said method further comprises:
    providing a supported voice codec list to said mobile cellular network; and
    automatically restarting said establishment of said voice call after failure of said voice call.

15. An apparatus of a mobile cellular network, comprising:
    a codec selector configured to select a voice codec for a hearing impaired call for a mobile communication device based on if said voice codec supports hearing impaired calls; and
    a communicator configured to establish said voice call with said mobile communication device employing said voice codec.

16. The apparatus as recited in claim 15 wherein said voice codec is a first voice codec and said codec selector is further configured to select a second voice codec during said hearing impaired call based on an error character rate, wherein said second voice codec has a lower voice quality than said first voice codec.

17. The apparatus as recited in claim 16 wherein said code selector is configured to receive said error character rate from said mobile communication device.

18. The apparatus as recited in claim 15 wherein said voice codec is a second voice codec and said codec selector is configured to select a first voice codec having a high voice quality for establishing said hearing impaired call and select said second voice codec during said hearing impaired call in response to a negotiation procedure to transmit characters during said hearing impaired call.

* * * * *